United States Patent
Ishii

(10) Patent No.: US 10,213,687 B2
(45) Date of Patent: Feb. 26, 2019

(54) INFORMATION PROCESSING SYSTEM, INFORMATION PROCESSING METHOD, INFORMATION PROCESSING PROGRAM, AND COMPUTER-READABLE RECORDING MEDIUM ON WHICH INFORMATION PROCESSING PROGRAM IS STORED

(71) Applicant: Sony Interactive Entertainment Inc., Tokyo (JP)

(72) Inventor: Makoto Ishii, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 256 days.

(21) Appl. No.: 14/844,361

(22) Filed: Sep. 3, 2015

(65) Prior Publication Data

US 2015/0375121 A1 Dec. 31, 2015

Related U.S. Application Data

(63) Continuation of application No. 13/877,823, filed as application No. PCT/JP2011/068365 on Aug. 11, 2011, now Pat. No. 9,189,146.

(30) Foreign Application Priority Data

Oct. 14, 2010 (JP) .................................. 2010-231798

(51) Int. Cl.
*A63F 13/71* (2014.01)
*A63F 13/211* (2014.01)
(Continued)

(52) U.S. Cl.
CPC .............. *A63F 13/42* (2014.09); *A63F 13/06* (2013.01); *A63F 13/10* (2013.01); *A63F 13/211* (2014.09);
(Continued)

(58) Field of Classification Search
CPC .... G06F 3/0488; G06F 3/04883; G06F 3/044; G06F 3/04886; G06F 3/045
See application file for complete search history.

(56) References Cited

U.S. PATENT DOCUMENTS

2002/0187835 A1* 12/2002 Nakayama .............. G07F 17/32
463/42
2003/0064805 A1 4/2003 Wells
(Continued)

FOREIGN PATENT DOCUMENTS

| CN | 1614545 | 5/2005 |
| CN | 1959346 | 5/2007 |

(Continued)

OTHER PUBLICATIONS

European Office Action dated Jun. 17, 2016 from corresponding Application No. 11 832 348.4.
(Continued)

*Primary Examiner* — Md Saiful A Siddiqui
(74) *Attorney, Agent, or Firm* — Katten Muchin Rosenman LLP

(57) ABSTRACT

When a game operation image is displayed on a touch panel of a portable terminal, the size of a game display screen and the operation image are small and therefore the progress of a game becomes difficult. Even in the case of a terminal having only a touch panel of a limited size, an operation image having a size that affects the progress of a game as little as possible is displayed on the touch panel by superimposing the operation image on a game display screen at a position that affects the progress of the game as little as possible.

8 Claims, 10 Drawing Sheets

(51) Int. Cl.
    *A63F 13/2145*    (2014.01)
    *A63F 13/42*    (2014.01)
    *A63F 13/537*    (2014.01)
    *G06F 3/0488*    (2013.01)
    *A63F 13/77*    (2014.01)
    *A63F 13/20*    (2014.01)
    *A63F 13/40*    (2014.01)
    *A63F 13/92*    (2014.01)

(52) U.S. Cl.
    CPC ........ *A63F 13/2145* (2014.09); *A63F 13/537* (2014.09); *A63F 13/77* (2014.09); *G06F 3/04886* (2013.01); *A63F 13/92* (2014.09); *A63F 2300/105* (2013.01); *A63F 2300/1075* (2013.01); *A63F 2300/204* (2013.01); *A63F 2300/305* (2013.01); *A63F 2300/6045* (2013.01)

(56) References Cited

U.S. PATENT DOCUMENTS

| | | |
|---|---|---|
| 2006/0077266 A1 | 4/2006 | Nurmi |
| 2007/0100543 A1 | 5/2007 | Kato et al. |
| 2008/0076578 A1* | 3/2008 | Tabata .................. A63F 13/12 463/42 |
| 2008/0288878 A1* | 11/2008 | Hayashi .......... H04M 1/274525 715/762 |
| 2009/0062004 A1* | 3/2009 | Vedurmudi ............. A63F 13/00 463/37 |
| 2009/0075687 A1 | 3/2009 | Hino et al. |
| 2009/0133499 A1* | 5/2009 | Cato ........................ G01P 5/08 73/514.16 |
| 2011/0157196 A1* | 6/2011 | Nave .................... G06F 9/4445 345/522 |

FOREIGN PATENT DOCUMENTS

| | | |
|---|---|---|
| CN | 101380519 | 3/2009 |
| EP | 0 768 105 A2 | 4/1997 |
| EP | 1 147 794 | 10/2001 |
| JP | 2006-236323 A | 9/2006 |
| JP | 2007-325709 | 12/2007 |

OTHER PUBLICATIONS

U.S. Office Action dated Dec. 17, 2014 from corresponding U.S. Appl. No. 13/877,823.
International search Report dated Sep. 6, 2011 from corresponding International Application No. PCT/JP2011/068365.
International Preliminary Report on Patentability and Written Opinion of the International Searching Authority dated May 16, 2013 from corresponding International Application No. PCT/JP2011/068365.
Japanese Office Action date Oct. 29, 2013 from corresponding Application No. 2010-231798.
European Search Report dated Apr. 29, 2014 from corresponding Application No. 11832348.4.
Chinese Notification of First Office Action dated May 4, 2015 from corresponding Application No. 201180049282.9.
Chinese Notification of the Second Office Action dated Oct. 26, 2015 from corresponding Application No. 201180049282.9.
European Office Action dated Mar. 6, 2018 for the Corresponding European Patent Application No. 11 832 348.4.

* cited by examiner

FIG.5

| TERMINAL INFORMATION | PROGRAM ID | SETTING FILE NAME |
|---|---|---|
| t1 | P1 | f11 |
| t2 | P1 | f21 |
| t2 | P1 | f21 |
| t2 | P2 | f22 |
| | | |

FIG.6

| OPERATION IMAGE INFORMATION ID | ARRANGEMENT INFORMATION | SIZE INFORMATION | TRANSPARENCY INFORMATION | CONVERSION RULE ADDRESS | ASSIGNMENT INFORMATION ADDRESS |
|---|---|---|---|---|---|
| i1 | (320, 160) | (160, 160) | 50 | r1 | a1 |
| i2 | (240, 160) | (50, 50) | 50 | r2 | a2 |

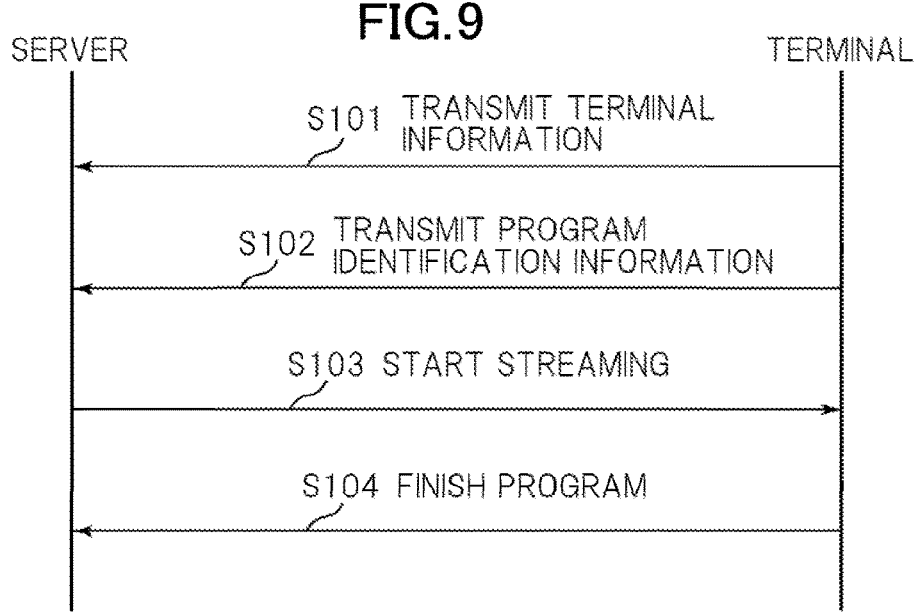
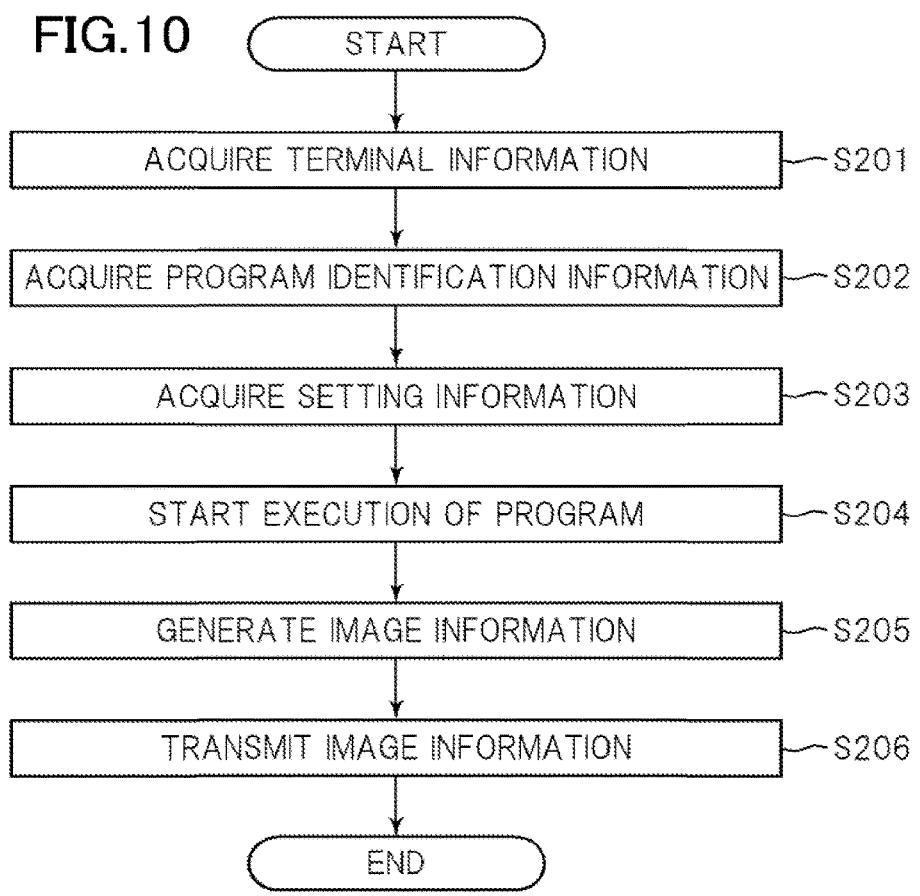

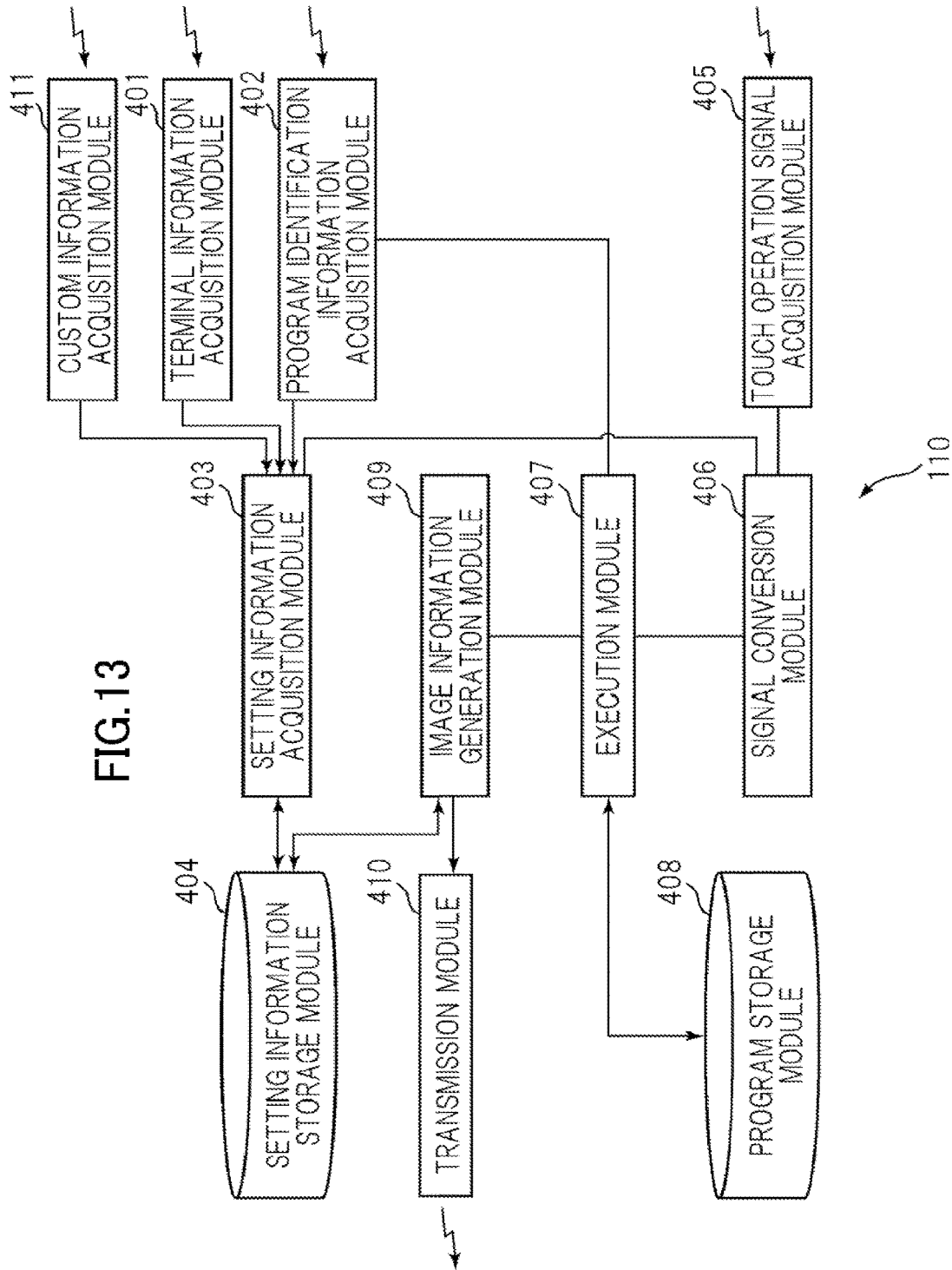

INFORMATION PROCESSING SYSTEM, INFORMATION PROCESSING METHOD, INFORMATION PROCESSING PROGRAM, AND COMPUTER-READABLE RECORDING MEDIUM ON WHICH INFORMATION PROCESSING PROGRAM IS STORED

TECHNICAL FIELD

The present invention relates to an information processing system, an information processing method, an information processing program, and a computer-readable recording medium having an information processing program stored thereon.

BACKGROUND ART

There is known a technology for executing a game program, which is produced to be executed on a dedicated machine, on a different device or the like by using an emulator. The game is produced to be executed on a device dedicated for the game, and is produced on the assumption that a dedicated controller is used for an operation of the game program.

Thus, for example, when the game program is executed on a different device which does not include the dedicated controller, an operation unit of the different device may not correspond to the dedicated controller.

SUMMARY OF INVENTION

Technical Problem

In this case, it is conceivable to display an operation image corresponding to the controller on a display screen of the game program on a touch panel of the different device. However, for example, when the different device is a portable terminal including a touch panel, the touch panel may not have a sufficient size, and the display screen of the game program is thus limited by the size of the touch panel, and may be forced to be small. On this occasion, the display screen of the game program needs to be further reduced for display by an area required for displaying the operation image. In this case, the user may not acquire sufficient information from the display screen, and the size of the displayed operation image becomes small so that it is difficult to operate.

One or more embodiments of the present invention has been devised in view of the foregoing problem, and has an object to provide an information processing system, an information processing method, an information processing program, and a computer-readable recording medium having the information processing program stored thereon, which can display, even on a terminal having only a touch panel in a limited size such as a touch panel of a portable terminal, an operation image having a size affecting a progress of a game as little as possible on the touch panel at a position affecting the progress of the game as little as possible by superimposing the operation image on a display screen of the game, thereby enabling a user to smoothly operate the game.

Solution to Problem

According to one or more embodiments of the present invention, an information processing system includes: a terminal information acquisition unit configured to acquire terminal information representing a type of a terminal provided with a touch panel; a program identification information acquisition unit configured to acquire program identification information for identifying a program so as to process in accordance with an operation signal output from a predetermined operation unit; a storage unit configured to store setting information including operation image identification information for identifying an operation image to be displayed on the touch panel, display position information representing a display position of the operation image, and conversion information for converting a touch operation signal directed to the operation image into the operation signal. The operation image identification information, the display position information, and the conversion information are stored in association with the terminal information and the program identification information. The information processing system also includes a setting information acquisition unit configured to acquire the setting information from the storage unit based on the acquired terminal information and the acquired program identification information; an execution unit configured to execute a program identified by the acquired program identification information; an image information generation unit configured to generate, based on the setting information acquired by the setting information acquisition unit, superimposed image information formed by superimposing the operation image on an image generated by the execution unit; and a signal conversion unit configured to convert, based on the conversion information, the touch operation signal into the operation signal. The execution unit executes the program based on the converted operation signal.

According to one or more embodiments of the present invention, an information processing method includes: acquiring terminal information representing a type of a terminal provided with a touch panel; acquiring program identification information for identifying a program for carrying out processing in accordance with an operation signal output from a predetermined operation unit; storing setting information including operation image identification information for identifying an operation image to be displayed on the touch panel, display position information representing a display position of the operation image, and conversion information for converting a touch operation signal directed to the operation image into the operation signal, the operation image identification information, the display position information, and the conversion information are associated with the terminal information and the program identification information. The information processing method also includes: acquiring the setting information based on the acquired terminal information and the acquired program identification information; executing a program identified by the acquired program identification information; generating, based on the acquired setting information, superimposed image information formed by superimposing the operation image on an image generated in the executing; converting, based on the conversion information, the touch operation signal into the operation signal; and executing the program based on the converted operation signal.

According to one or more embodiments of the present invention, an information processing program causes a computer to function as: a terminal information acquisition unit configured to acquire terminal information representing a type of a terminal provided with a touch panel; a program identification information acquisition unit configured to acquire program identification information for identifying a program for carrying out processing in accordance with an operation signal output from a predetermined operation unit; a storage unit configured to store setting information including operation image identification information for identifying an operation image to be displayed on the touch panel, display position information representing a display position of the operation image, and conversion information for converting a touch operation signal directed to the operation image into the operation signal. The operation image identification information, the display position information, and the conversion information are associated with the terminal information and the program identification information. The information processing program also causes a computer to function as: a setting information acquisition unit configured to acquire the setting information from the storage unit based on the acquired terminal information and the acquired program identification information; an execution unit configured to execute a program identified by the acquired program identification information; an image information generation unit configured to generate, based on the setting information acquired by the setting information acquisition unit, superimposed image information formed by superimposing the operation image on an image generated by the execution unit; and a signal conversion unit configured to convert, based on the conversion information, the touch operation signal into the operation signal. The execution unit executes the program based on the converted operation signal.

Advantageous Effects of Invention

It is possible to provide the information processing system, the information processing method, the information processing program, and the computer-readable recording medium having an information processing program stored thereon, which can display the operation image on the touch panel of the terminal at the position and/or in the size that affects a progress of a program as little as possible by superimposing the operation image on a display screen of the program, thereby enabling a user to smoothly operate the program.

BRIEF DESCRIPTION OF DRAWINGS

FIG. 5 A diagram illustrating a state of storage in a setting information storage module according to the embodiment of the present invention.

FIG. 6 A diagram illustrating setting information according to the embodiment of the present invention.

FIG. 9 A diagram illustrating an overview of processing by the information processing system according to the embodiment of the present invention.

FIG. 10 A flowchart illustrating a flow on the server until a program starts according to the embodiment of the present invention.

FIG. 13 A diagram illustrating a functional configuration of the server according to the modified example of the present invention.

DESCRIPTION OF EMBODIMENTS

Figure 1:
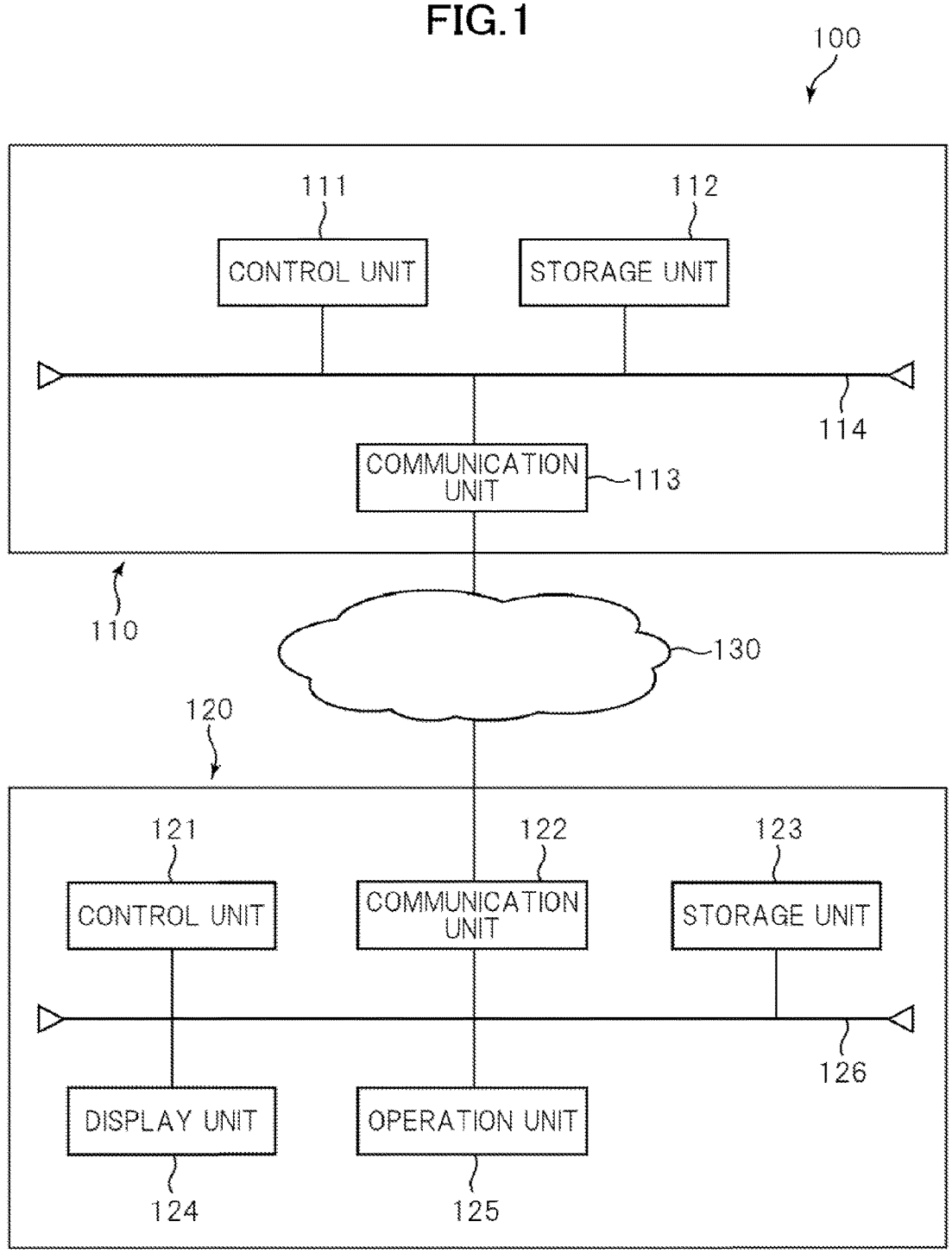
FIG. 1 A diagram illustrating an overview of a hardware configuration of an information processing system according to an embodiment of the present invention.

A description is now given of an embodiment of the present invention referring to the drawings. Throughout the drawings, the same or similar components are denoted by the same reference numerals, and a duplicated description thereof is therefore omitted.

FIG. 1 is a diagram illustrating an overview of a hardware configuration of an information processing system according to the embodiment of the present invention. As illustrated in FIG. 1, an information processing system 100 includes a server 110 and a terminal 120 connected to each other via a network 130 (such as the Internet). Although the information processing system 100 in FIG. 1 shows only one terminal 120, the information processing system 100 may include a plurality of other terminals 120.

As illustrated in FIG. 1, the server 110 includes a control unit 111, a storage unit 112, and a communication unit 113. Moreover, the control unit 111, the storage unit 112, and the communication unit 113 are connected to one another via a bus 114. The control unit 111 is, for example, a CPU, and operates in accordance with a program stored in the storage unit 112. The storage unit 112 includes an information recording medium such as a hard disk drive, a ROM, or a RAM, and is an information recording medium storing programs executed by the control unit 111. Moreover, the storage unit 112 also operates as a work memory for the control unit 111. The communication unit 113 is, for example, a network interface, and, in accordance with an instruction from the control unit 111, transmits/receives information via the network 130.

The terminal 120 includes a control unit 121, a communication unit 122, a storage unit 123, a display unit 124, and an operation unit 125. Similarly, the respective units 121 to 125 are connected to one another via a bus 126. As in the above-mentioned server 110, the control unit 121 is, for example, a CPU, and operates in accordance with a program stored in the storage unit 123. The communication unit 122 is a network interface, and, in accordance with an instruction from the control unit 121, transmits/receives information via the network 130.

The storage unit 123 includes an information recording medium such as a hard disk, a ROM, or a RAM, and is an information recording medium storing programs executed by the control unit 121. Moreover, the storage unit 123 also operates as a work memory for the control unit 121. The display unit 124 is, for example, a liquid crystal display or an organic EL display, and displays information in accordance with an instruction from the control unit 121. The operation unit 125 includes, for example, an interface such as a keyboard, a mouse, a controller, and a button, and outputs, in response to an instruction operation by a user, details of the instruction operation to the control unit 121.

The programs processed by the control units 111 and 121 may be downloaded and provided, for example, via a network, or may be provided by means of various computer-readable information recording media such as a CD-ROM and a DVD-ROM. Note that, the above-mentioned configurations of the server 110 and the terminal 120 are examples, and are not limited thereto. Moreover, a detailed description is given later as to functional configurations of the server 110 and the terminal 120.

Figure 2:
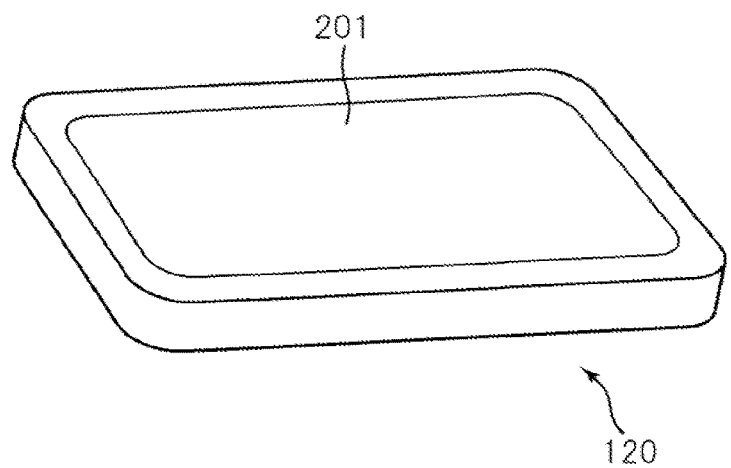
FIG. 2 A diagram illustrating an example of an exterior of a terminal according to the embodiment of the present invention.

FIG. 2 is a diagram illustrating an example of an exterior of the terminal. As illustrated in FIG. 2, the terminal 120 (for example, a portable terminal) is in a shape of a substantially rectangular plate as a whole, and includes, on the surface, a touch panel 201 as the display unit 124. The touch panel 201 is in a substantially rectangular shape, and includes a display and a touch sensor. Note that, the display is, for example, a liquid crystal display panel or an organic EL display panel.

The touch sensor is disposed while being superposed on the display, and has a detection surface in a shape corresponding to a display surface of the display. The touch sensor detects, for example, at a predetermined time interval, contact of an object such as the finger of the user or a stylus on the detection surface, to thereby detect the operation instruction by the user. Though the touch sensor may be, for example, a capacitive sensor, a pressure sensitive sensor, or an optical sensor, other type of sensor may be used as long as the sensor can detect the contact of an object on the detection surface. Moreover, for example, the touch sensor may be configured to detect whether or not contact is made by an object, and position information thereof as well as the degree of a pressure applied on the detection surface by the contact of the object.

It should be understood that the terminal 120 may include, in addition to the touch panel 201, other input units such as a button, a switch, and an imaging sensor on a front surface or side surfaces of the terminal 120. Moreover, the exterior of the terminal 120 is not limited to the above-mentioned exterior, and may be a different exterior which can achieve practically the same configuration, can provide the same actions and effects, or can achieve the same object as the configuration described in the embodiment.

Figure 3:
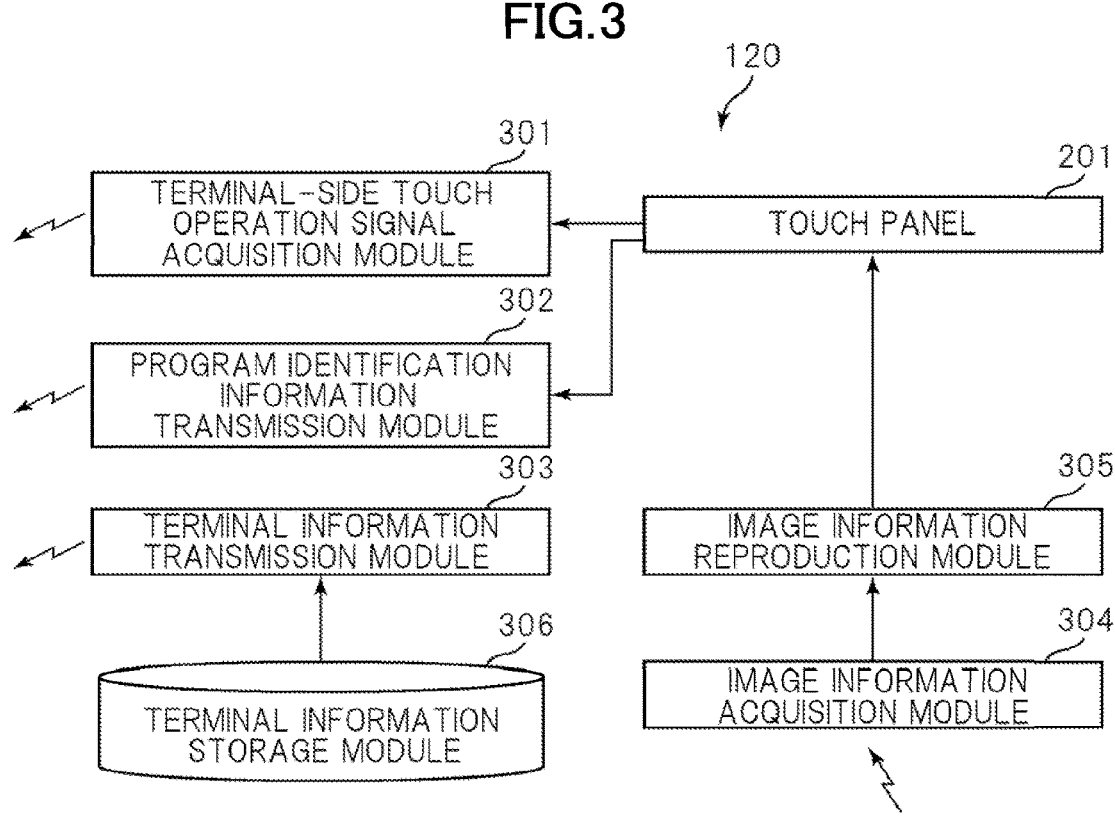
FIG. 3 A diagram illustrating a functional configuration of the terminal according to the embodiment of the present invention.

A description is now given of the functional configuration of the terminal 120. FIG. 3 is a diagram illustrating the functional configuration of the terminal. As illustrated in FIG. 3, the terminal 120 includes the touch panel 201, a terminal-side touch operation signal acquisition module 301, a program identification information transmission module 302, a terminal information transmission module 303, an image information acquisition module 304, and an image information reproduction module 305.

The terminal-side touch operation signal acquisition module 301 acquires a touch operation signal input to the touch panel 201, and transmits the touch operation signal to the server 110. On this occasion, the touch operation signal corresponds to an operation instruction signal by the user detected by the touch sensor of the touch panel 201. The program identification information transmission module 302 acquires program identification information for identifying a program specified by the user, and transmits the acquired program identification information to the server 110. As used herein, the program identification information means information for identifying a program specified by the user, and is input by using, for example, the touch panel 201 of the terminal 120 and other buttons.

The terminal information transmission module 303 acquires terminal information stored in a terminal information storage module 306, and transmits the terminal information to the server 110. As used herein, the terminal information means information for identifying a type of the terminal 120, and corresponds to, for example, information such as a model number assigned in advance for each type of the terminal. The image information acquisition unit 304 acquires image information transmitted from the server 110. Note that, the image information is described in detail later. The image information reproduction unit 305 reproduces the acquired image information on the touch panel 201.

Note that, the functional configuration of the terminal 120 is not limited to the above-mentioned configuration, and may be replaced by practically the same configuration, a configuration which provides the same actions and effects, or a configuration which can achieve the same object as the configuration described in the embodiment. For example, though only the touch panel 201 is illustrated as the operation unit 125 in FIG. 3, the terminal 120 may have a configuration which includes one or more buttons and other input units, acquires the touch operation signal, the program identification information, and the like via an operation on the buttons and the like, and transmits the signal, the information, and the like to the server 110.

Figure 4:
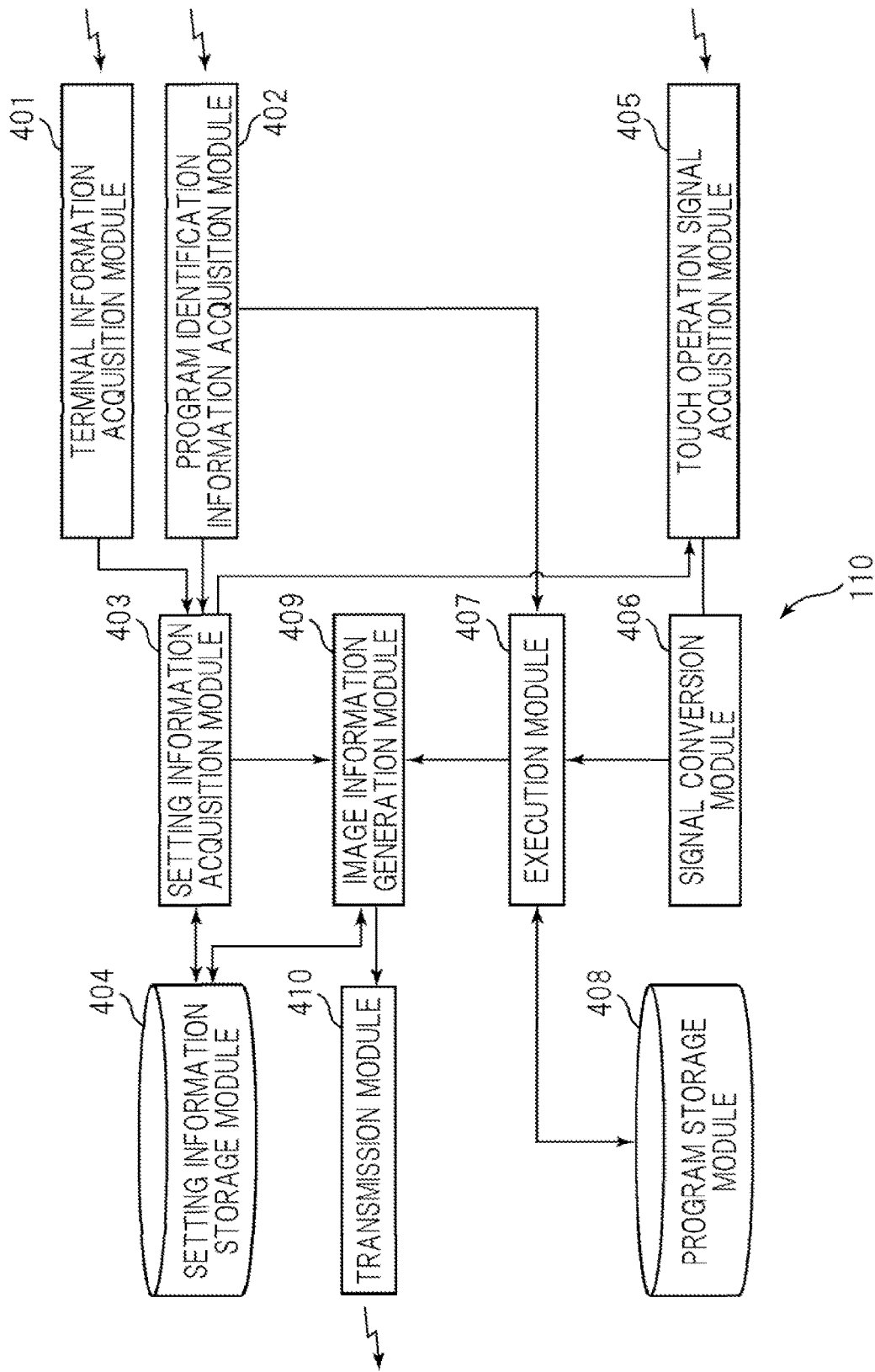
FIG. 4 A diagram illustrating a functional configuration of a server according to the embodiment of the present invention.

FIG. 4 is a diagram illustrating the functional configuration of the server. As illustrated in FIG. 4, the server 110 includes a terminal information acquisition module 401, a program identification information acquisition module 402, a setting information acquisition module 403, a setting information storage module 404, a touch operation signal acquisition module 405, a signal conversion module 406, an execution module 407, a program storage module 408, an image information generation module 409, and a transmission module 410.

The terminal information acquisition module 401 acquires the terminal information representing the type of the terminal 120 from the terminal 120. The program identification information acquisition module 402 acquires, from the terminal 120, program identification information for identifying a program (such as a desired game program) selected by the user using the terminal 120. The setting information acquisition module 403 acquires, based on the acquired terminal information and program identification information, from the setting information storage module 404, setting information stored in association with the terminal information and the program identification information. Note that, the setting information storage module 404 may be included in the storage unit 112 of the server 110, or may be included in a database (not shown) which is outside the server 110 and is connected via the network 130.

Specifically, for example, the setting information storage module 404 stores, as illustrated in FIG. 5, the terminal information, the program identification information (program ID) and a file name of a setting file (setting file name) in a tabular form. Moreover, the setting file includes information on an operation image to be displayed on the touch panel 201 of the terminal 120, and conversion information for converting the touch operation signal into an operation signal assumed in advance by a program. Specifically, for example, as illustrated in FIG. 6, the setting file stores an operation image information ID, arrangement information, size information, transparency information, a conversion rule address, and an assignment information address in a tabular form.

On this occasion, the operation image information ID corresponds to information for identifying an operation image for an operation unit displayed on the touch panel 201. The arrangement information corresponds to information representing a display position of the operation image on the touch panel 201, and includes, for example, an x coordinate and a y coordinate set on the touch panel 201. The size information is information representing a size of the operation image, and, for example, includes sizes in the x direction and the y direction set on the touch panel 201. The transparency information corresponds to information representing a transparency of the operation image, and representing the transparency by a numerical value ranging, for example, from 0 to 100. The conversion rule address is an address for a conversion rule for converting the touch operation signal into an operation signal assumed in advance in a program. The assignment information address corresponds to, for example, information on how to assign each of input signals (touch operation signals) on the operation image to each of input signals (operation signals) on an operation unit such as an existing controller assumed in the program. For example, an input on an operation image representing a button is assigned to an input on an "a" button of an existing controller, and an input on an up key of an operation image representing a cross key described later is assigned to an input on an up key of a cross key of the existing controller.

More specifically, for example, in the examples illustrated in FIG. 5 and FIG. 6, in the setting information storage module 404, when the acquired terminal information and program identification information are respectively t1 and P1, the setting information acquisition module 403 acquires a setting file name f11. Then, when a content of the setting file name f11 corresponds to the case of FIG. 6, the setting information acquisition module 403 acquires operation image information IDs i1 and i2, and arrangement information, size information, transparency information, conversion rules, and assignment information corresponding to the operation image information IDs as the setting information. In other words, the operation image having the operation image information ID of i1 is displayed at a position having an x coordinate of 320 and a y coordinate of 160 of coordinates set on the touch panel 201, in a size of 160 in the x direction and a size of 160 in the y direction represented by the size information, and at a transparency of 50 in alpha value. Then, in accordance with a conversion rule having a conversion rule address r1, the input signal (touch operation signal) on the operation image is converted, and the touch operation signal is assigned to an input signal (operation signal) on an operation unit of an existing controller or the like by the assignment information having an assignment information address a1. The same holds true for the operation image information ID of i2, and a description thereof is therefore omitted. Moreover, though the two operation images represented by the operation image information IDs of i1 and i2 are to be displayed in the case of FIG. 6, it should be understood that other number of operation image information IDs can be stored.

A detailed description is now given of the operation image information. The operation image information represented by an operation image information ID is, for example, image information for generating operation images displayed on the touch panel 201 as illustrated in FIGS. 7(A) to 7(E).

Figure 7:
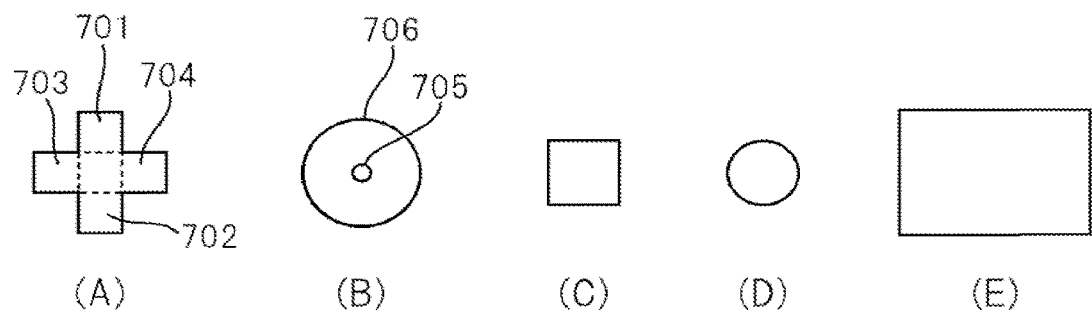
FIG. 7 Diagrams illustrating operation images according to the embodiment of the present invention.

FIG. 7(A) illustrates an example of the operation image displaying a so-called cross key (digital cross button). For example, as illustrated in FIG. 7(A), the operation image includes portions that correspond to an up direction key 701, a down direction key 702, a left direction key 703, and a right direction key 704. Then, when the respective direction keys 701 to 704 are displayed on the touch panel 201, the terminal-side touch operation signal acquisition module 301 acquires an operation signal representing whether or not each of the direction keys 701 to 704 is touched as the touch operation signal.

FIG. 7(B) illustrates an example of an operation image corresponding to a so-called analog operation unit. For example, when the operation image is displayed on the touch panel 201, a signal corresponding to a position and a distance of a moving portion 705 of the operation image with respect to a peripheral portion 706 thereof is detected as the touch operation signal. Specifically, for example, the user moves the moving portion 705 up/down or left/right, and an output corresponding to a position and a distance of the moving portion 705 with respect to the peripheral portion 706 is acquired as the touch operation signal by the terminal-side touch operation signal acquisition module 301. In other words, this configuration acquires not digital information representing whether or not a certain direction key is touched as in the case of the cross key, but an output corresponding to the position and the distance of the moving portion with respect to the peripheral portion, and the moving portion and the peripheral portion thus correspond to the analog operation unit.

FIG. 7(C) illustrates an example of an operation image corresponding to a so-called button. When this operation image is displayed on the touch panel 201, whether or not the button is touched is acquired by the terminal-side touch operation signal acquisition module 301 as the touch operation signal. Note that, the degree of the pressure applied to the button may also be detected, and an output corresponding to the pressure may be acquired. The shape of the operation image may be, for example, a rectangular shape as illustrated in FIG. 7(C), a circular shape as illustrated in FIG. 7(D), or other shapes.

FIG. 7(E) illustrates an example of an operation image corresponding to a so-called scratch pad. Specifically, for example, the terminal-side touch operation signal acquisition module 301 detects position information on a position touched by the finger of the user or the like on the displayed scratch pad, to thereby detect the instruction operation by the user as the touch operation signal. Note that, the degree of the pressure applied to the scratch pad may also be detected, and an output corresponding to the pressure may be acquired. Moreover, for example, a tap operation of tapping the scratch pad may be assigned to an arbitrary button of a controller assumed in advance by a program.

The above-mentioned setting information is examples, and is not limited to the above-mentioned examples. For example, the setting information storage module 404 may further store the user ID in association with the terminal information, the program identification information, and the setting file name, and the setting information acquisition module 403 may acquire the setting information based on the terminal information, the program identification information, and the user ID. Moreover, though the description has been given of the operation images, in another case where the terminal 120 includes an acceleration sensor which can detect an acceleration, a displacement, a yaw, and the like in the three-dimensional space, the setting information storage module 404 may store addresses of conversion rules and assignment information for the acceleration sensor. In this case, conversion rules and assignment information for detected values of the acceleration, the displacement, and the yaw are stored. Further, it should be understood that the setting information may similarly include conversion rules, assignment information, and the like for other input units such as a button included in the terminal 120.

The touch operation signal acquisition module 405 acquires, from the terminal 120, the above-mentioned touch operation signal. As described above, the touch operation signal corresponds to, for example, an operation signal generated at a predetermined time interval by the user based on contact, on the detection surface, of an object such as the finger of the user or a stylus. The signal conversion module 406 converts the touch operation signal acquired by the touch operation signal acquisition module 405 into an operation signal based on the setting information acquired by the setting information acquisition module 403. Specifically, the signal conversion module 406 converts, based on the acquired conversion rule and assignment information, the touch operation signal into an operation signal, and the execution module 407 acquires the operation signal.

For example, the conversion rule is, when the operation image is a cross key, a rule for converting from an input signal (touch operation signal) for the x or y direction of the cross key to an input signal (operation signal) of an existing controller, and corresponds to, for example, when an touch operation signal representing a continuous movement is input on an operation image, conversion into an operation signal increased in acceleration by 5%. Moreover, the conversion rule may include a rule for adjusting a sensitivity of the touch operation signal. For example, for a predetermined touch operation signal (for example, a touch operation signal considered as noise), for example, the value of an operation signal converted therefrom is set to zero.

The execution module 407 acquires, based on the program identification information from the program identification information acquisition module 402, from the program storage module 408, a program indicated by the program identification information, and executes the program. Moreover, the operation of the program by the execution module 407 is executed based not on the touch operation signal, but on the above-mentioned operation signal. As a result, a program produced for execution on a dedicated device can be executed on the information processing system 100 according to this embodiment. Moreover, for example, the execution module 407 is formed by an emulator. Further, the program storage module 408 stores program identification information and a program in association with each other. Note that, the program storage module 408 may include the storage unit 112 of the server 110, or may include a database (not shown) or the like external to the server 110.

Figure 8:
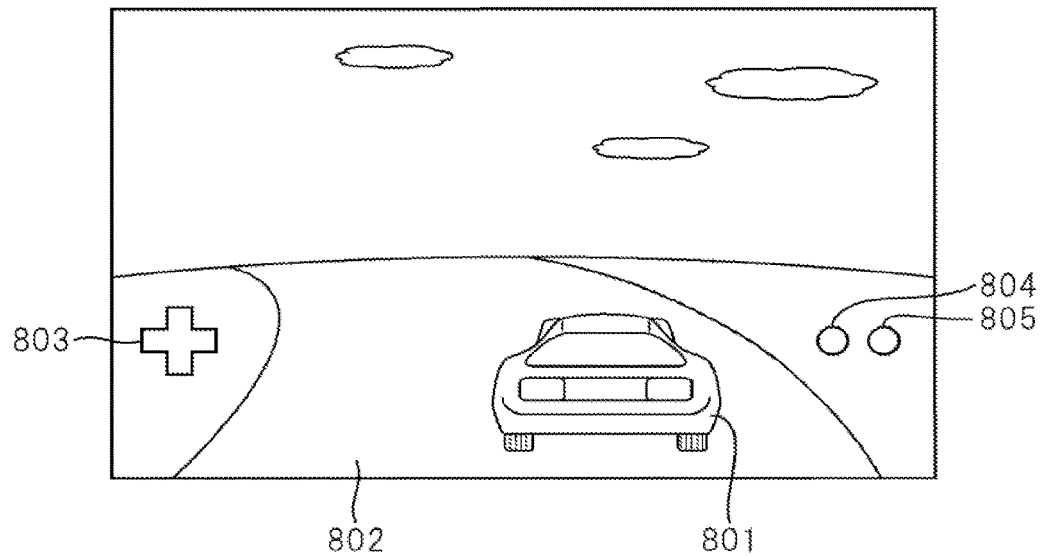
FIG. 8 A diagram illustrating an example of a display screen displayed on the terminal according to the embodiment of the present invention.

The image information generation module 409 generates an operation image based on the arrangement information, the size information, and the transparency information corresponding to the acquired operation image information ID, thereby generating superimposed image information which is the operation image superimposed on the image information generated by the execution module 407 for display. Specifically, for example, when a description is given referring to the example in FIG. 6, the image information generation module 409 generates image information for displaying the operation image (such as the operation image of the cross key) having the operation image information ID of i1 at a location of 320 in the x coordinate and 160 in the y coordinate, in the size represented by 160, and at the transparency of 50 to be superimposed on the image information generated by the execution module 407. On this occasion, the arrangement information for the operation image is set, in advance, to a location which does not interfere with the progress of the program made by the user, and the size information on the operation image is set to a size which does not interfere with the progress of the program as well. More specifically, a description is given of an example of FIG. 8 illustrating a state where the program is a program for a race game, and the display screen for the race game is displayed on the terminal 120.

For example, on the display screen of the race game, it is considered that information, which is important for the progress of the game for the user, includes an image representing a vehicle 801 operated by the user and an image representing a course 802 of the race, and other portions are not particularly important for the progress itself of the game. Thus, the arrangement information may be set so that operation images 803 to 805 are arranged on portions representing a background outside the course 802. Moreover, the size information may be set to realize a size which does not obstruct the display of the vehicle 801 and the course 802 even when the finger of the user or the like is placed on the operation image, and simultaneously promotes the operation by the user.

Moreover, when the operation image 803 and the like are displayed while being superimposed on a score display and the like (not shown in FIG. 8), the operation image 803 is set to have a certain level of transparency (such as a transparency having an alpha value of 50), thereby enabling the user to refer to the score display as necessary (for example, when a pose is instructed). For example, it should be understood that, when it is considered that the image information at the position is information which is not important or is not necessary for the progress of the game, the transparency may be set to an alpha value of 100 (for example, corresponding to a value representing non-transparency). Moreover, the transmission module 410 transmits the superimposed image generated by the image information generation module 409 as described above to the terminal 120.

Note that, the functional configurations of the terminal 120 and the server 110 are not limited to the above-mentioned configurations, and may be replaced by practically the same configurations, configurations which provide the same actions and effects, or configurations which can achieve the same object as the configurations described in the embodiment. For example, the above-mentioned functions of the server 110 in part or entirety may be included in the terminal 120, or the functions of the terminal 120 in part or entirety may be included in the server 110. For example, though the description has been given of the configuration where the server 110 includes the signal conversion module 406, the terminal 120 may include the signal conversion module 406, the server 110 may acquire the touch operation signal (corresponding to the operation signal) converted by the signal conversion module 406, and the execution module 407 may acquire the operation signal. Moreover, for example, when the terminal 120 is a game machine, and has a high processing performance, the execution module 407, the image information generation module 409, and the like may be formed on the terminal 120, and the terminal 120 may transmit the superimposed image via the network 130 to another terminal 120.

Moreover, the server 110 and the terminal 120 may include a compression module and a decompression module which are omitted for the sake of simple illustration in FIGS. 3 and 4. In this case, the compression module of the server 110 compresses, for example, the image information generated by the image information generation module 409, and the transmission module 410 transmits the compressed image information to the terminal 120. On the other hand, the decompression module of the terminal 120 decompresses the image information acquired from the server 110, and the image information reproduction module 305 reproduces the decompressed image information.

Now, referring to FIG. 9, a description is given of an overview of a flow of processing by the information processing system 100 according to this embodiment. As illustrated in FIG. 9, the terminal information transmission module 303 acquires the terminal information on the terminal 120 from the terminal information storage module 306, and transmits the terminal information to the server 110. Then, the terminal information acquisition module 401 of the server 110 acquires the terminal information (S101).

Moreover, the user selects a desired program by operating the operation unit 125 (such as the touch panel 201) of the terminal 120. As a result, the program identification information transmission module 302 transmits program identification information on the program to the server 110, and the program identification information acquisition module 402 of the server 110 acquires the program identification information (S102).

Then, when the start of the program is instructed by the terminal 120, the execution module 407 executes the program as described above. Then, the image information on which the operation image generated by the image information generation module 409 is superimposed is transmitted to the terminal 120 (S103). Note that, the image information in this case may be compressed image information as described above. In this way, for example, by means of the so-called streaming, the image information is displayed on the touch panel 201 of the terminal 120. Then, when the end of the program is instructed by the terminal 120, the execution module 407 finishes the execution of the program, and ends the processing (S104).

It should be understood that the streaming may include sound information. Moreover, though the description has been given of the flow where the terminal 120 transmits the program identification information and the terminal information in S101 and S102 for the sake of simplicity of description, the flow may be such a different flow that, before S101, a flow of transmitting a user ID and a password from the terminal 120 to the server 110, a flow of transmitting an authentication result from the server 110, and the like are provided, and, on this occasion, the terminal information is transmitted from the terminal 120 as long as the flow can attain practically the same actions and effects or object as the above-mentioned flow.

A more detailed description is now given of a flow of processing by the server 110 according to this embodiment. FIG. 10 is a flowchart illustrating a flow on the server until a program starts. As illustrated in FIG. 10, the terminal information acquisition unit 401 acquires, from the terminal 120, terminal information representing the type of the terminal 120 (S201). The program identification information acquisition module 402 acquires, from the terminal 120, the program identification information (S202). Specifically, for example, the program identification information is acquired when the user uses the operation unit 125 (such as the touch panel 201) of the terminal 120 to select a desired program. The setting information acquisition module 403 acquires the setting information from the setting information storage module 404 based on the acquired terminal information and program identification information (S203).

The execution module 407 starts the execution of the program represented by the program identification information (S204). The execution of the program is carried out by, for example, the user using the operation unit 125 (such as the touch panel 201) of the terminal 120 to instruct the start of the execution of the program. The image information generation module 409 generates the image information (superimposed image information) to display the operation image generated based on the setting information while superimposing the operation image on the image information generated by the execution of the program (S205). Then, the transmission module 410 transmits the superimposed image information to the terminal 120 (S206).

Figure 11:
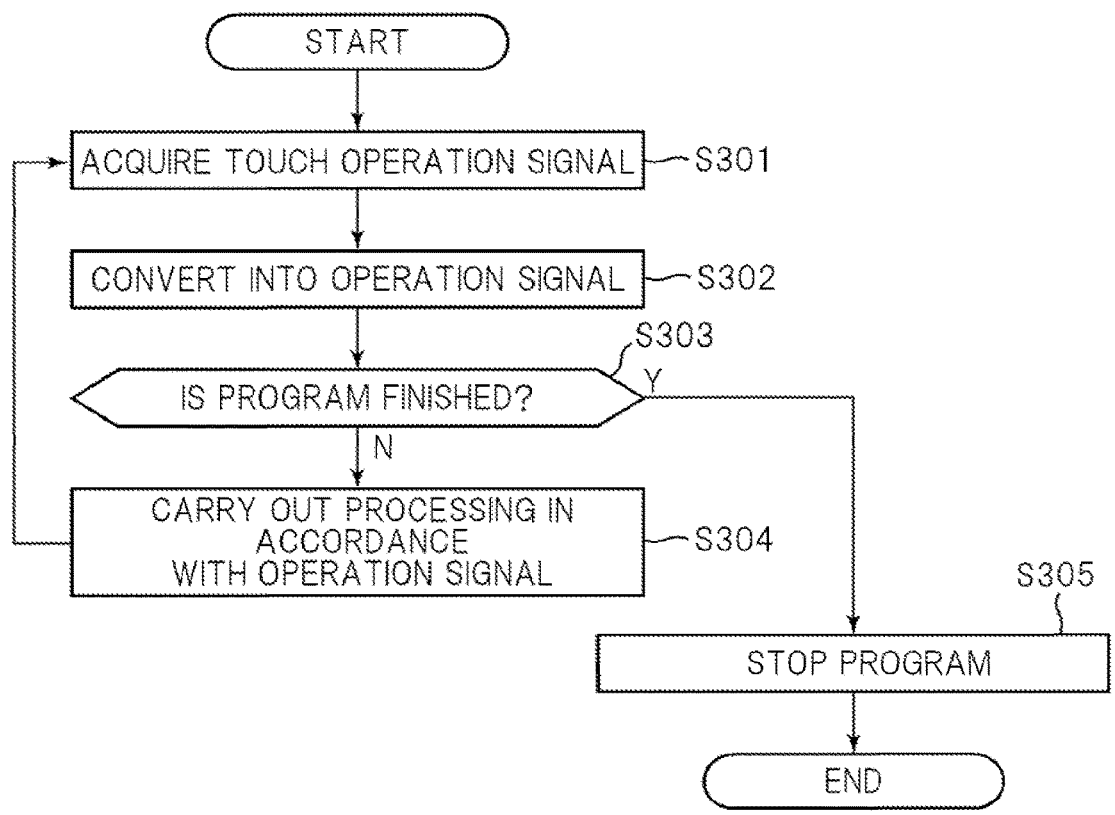
FIG. 11 A flowchart illustrating a flow on the server after the program is started by an execution module until the program is finished according to the embodiment of the present invention.

FIG. 11 is a flowchart illustrating a flow on the server after the program is started by the execution module until the program is finished. As illustrated in FIG. 11, the touch operation signal acquisition module 405 acquires the touch operation signal from the terminal 120 (S301). The signal conversion module 406 converts the touch operation signal into the operation signal based on the setting information (S302).

The execution module 407 determines whether or not the operation signal represents the end of the program (S303). When the operation signal is an operation signal other than that representing the end of the program, the execution module 407 carries out processing in accordance with the operation signal (S304). Then, the flow returns to S301. On the other hand, when the operation signal represents the end of the program, the execution module 407 stops the program, and ends the processing (S305).

The flow of the information processing system is not limited to the above-mentioned flow, and may be replaced by a flow which provides the same actions and effects or a flow which can achieve the same object as the flow described in the above-mentioned flow.

Note that, the present invention is not limited to the above-mentioned embodiment, and may be replaced by practically the same configuration, a configuration which provides the same actions and effects, or a configuration which can achieve the same object as the configuration described in the embodiment.

MODIFIED EXAMPLE

Figure 12:
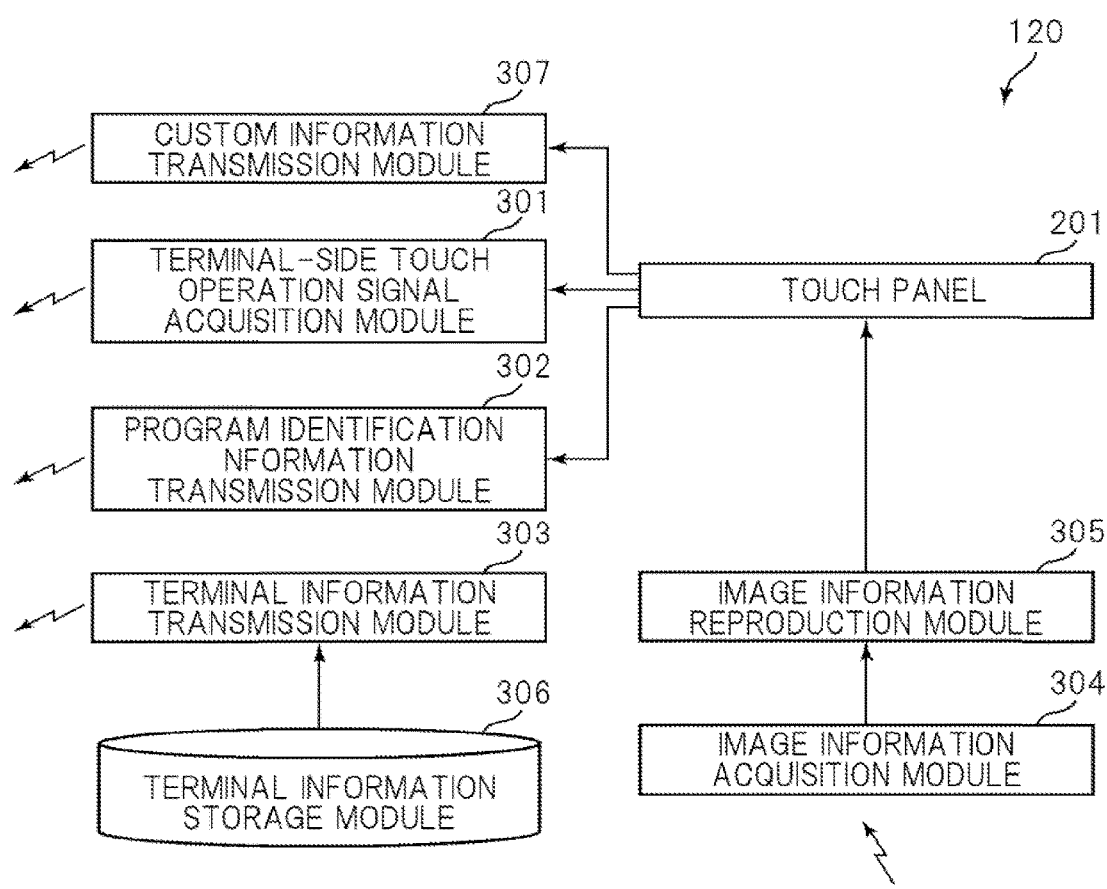
FIG. 12 A diagram illustrating a functional configuration of the terminal according to a modified example of the present invention.

A description is now given of a modified example of the present invention. Note that, a description is not given of the same points as those of the embodiment. FIG. 12 is a diagram illustrating a functional configuration of the terminal according to this modified example. As illustrated in FIG. 12, the terminal 120 according to this modified example further includes a custom information transmission module 307. The custom information transmission module 307 transmits custom information input by the user via the touch panel 201 or the like to the server 110. As used herein, the custom information means information for changing the setting information by the user, and is information for changing setting information on, for example, the arrangement and size, the assignment information, and the conversion rule for a certain operation image. Specifically, the custom information is, for example, information for changing, when the user often uses an operation image corresponding to a specific button in a certain program, the position of the operation image to a place where the user can more readily operate the operation image, and for assigning a specific plurality of operation images corresponding to a combination of a specific plurality of buttons to one operation image.

FIG. 13 is a diagram illustrating a functional configuration of the server according to this modified example. As illustrated in FIG. 13, the server 110 according to this modified example further includes a custom information acquisition module 411. The custom information acquisition module 411 acquires the custom information from the terminal 120. The setting information acquisition module 403 modifies, based on the custom information, corresponding setting information stored in the setting information storage module 404. Then, based on the acquired terminal information and program identification information, the modified setting information is acquired from the setting information storage module 404. The other components carry out the same processing as those of the embodiment, and a detailed description thereof is therefore omitted.

Note that, the present invention is not limited to the above-mentioned embodiment and the modified example, and may be replaced by practically the same configuration, a configuration which provides the same actions and effects, or a configuration which can achieve the same object as the configuration described in the embodiment and the modified example. For example, the setting information changed by a user may be referred to by another user. Moreover, a plurality of pieces of setting information may be stored for the same terminal information and program identification information, and a user may select a desired piece of setting information from the plurality of pieces of setting information.

The invention claimed is:

1. A non-transitory computer readable medium having stored thereon a program for causing a terminal having a processor to execute steps comprising:
   transmitting, using the processor, terminal information representing a type of the terminal to a server,
   acquiring program identification information from a user for identifying a program selected by a user utilizing a touch screen of the terminal;
   transmitting, using the processor, the program identification information to the server,
   receiving, from the server, image information,
   wherein the received image information comprises a superimposed image formed by superimposing a plurality of operating images at fixed positions over a program image according to received arrangement information, and
   wherein the received image information is determined based upon the transmitted terminal information and transmitted program identification information; and
   displaying the image information on a display screen of the terminal, and
   providing input to the program using the plurality of operating images,
   wherein each operating image is a graphic symbol, and touch operations performed on the graphic symbols are converted into input signals from a game controller originally used to control the program.

2. The non-transitory computer readable medium according to claim 1, wherein a transparency of the operation image in the superimposed image is determined transmitted terminal information and transmitted program identification information.

3. The non-transitory computer readable medium according to claim 1, wherein the operation image is modified by a user using the touch screen.

4. The non-transitory computer readable medium according to claim 1, wherein the program is executed on the terminal using an emulator.

5. The terminal according to claim 1, wherein the terminal comprises:
   an acceleration sensor,
   wherein the acceleration sensor is used to provide input to the program.

6. The non-transitory computer readable medium according to claim 1,
   wherein the received image information is determined based upon the transmitted terminal information, the transmitted program identification information, and transmitted user information.

7. The non-transitory computer readable medium according to claim 1, wherein the terminal information is retrieved from a memory of the terminal.

8. An information processing method executed by a processor on a terminal, comprising:
   transmitting, using the processor, terminal information representing a type of the terminal to a server,
   acquiring program identification information from a user for identifying a program selected by a user utilizing a touch screen of the terminal;
   transmitting, using the processor, the program identification information to the server,
   receiving, from the server, image information,
   wherein the received image information comprises a superimposed image formed by superimposing a plurality of operating images at fixed positions over a program image according to received arrangement information, and
   wherein the received image information is determined based upon the transmitted terminal information and transmitted program identification information; and
   displaying the image information on a display screen of the terminal, and
   providing input to the program using the plurality of operating images, wherein each operating image is a graphic symbol, and touch operations performed on the graphic symbols are converted into input signals from a game controller originally used to control the program.

* * * * *